(12) United States Patent
Kneafsey et al.

(10) Patent No.: US 6,939,932 B2
(45) Date of Patent: Sep. 6, 2005

(54) INITIATOR SYSTEMS, POLYMERISABLE COMPOSITIONS, AND USES THEREOF FOR BONDING LOW SURFACE ENERGY SUBSTRATES

(75) Inventors: Brendan J. Kneafsey, Lucan (IE); Gerry Coughlan, Kilnamanagh (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 10/419,202

(22) Filed: Apr. 21, 2003

(65) Prior Publication Data

US 2004/0010099 A1 Jan. 15, 2004

(30) Foreign Application Priority Data

Apr. 23, 2002 (IE) .......................................... 2002/0293

(51) Int. Cl.[7] .................................................. C08F 4/00
(52) U.S. Cl. .................... 526/217; 526/317.1; 526/198; 526/319; 428/500; 106/18.13; 156/333.1
(58) Field of Search .......................... 524/853; 106/18.3, 106/18.13; 526/217, 317.1, 213, 319, 198; 156/333.1; 426/90

(56) References Cited

U.S. PATENT DOCUMENTS

| | | | |
|---|---|---|---|
| 3,236,823 A | 2/1966 | Jennes et al. ............... | 260/80.5 |
| 3,849,187 A | 11/1974 | Fetscher et al. ............ | 117/201 |
| 4,515,724 A | 5/1985 | Ritter ......................... | 260/410 |
| 4,638,092 A | 1/1987 | Ritter ......................... | 568/1 |
| 4,638,498 A | 1/1987 | Sinniger et al. .............. | 377/39 |
| 4,676,858 A | 6/1987 | Ritter ........................ | 156/307.3 |
| 4,921,921 A | 5/1990 | Ritter ......................... | 526/195 |
| 5,106,928 A | 4/1992 | Skoultchi et al. ........... | 526/196 |
| 5,684,102 A | 11/1997 | Pocius et al. ............... | 526/198 |
| 5,825,389 A | 10/1998 | Cowger ....................... | 347/18 |
| 5,908,881 A | 6/1999 | Sakamoto .................... | 523/442 |
| 5,935,711 A | 8/1999 | Pocius et al. ............... | 428/421 |
| 6,180,696 B1 | 1/2001 | Wong et al. ................. | 523/457 |
| 6,252,023 B1 | 6/2001 | Moren ......................... | 526/196 |
| 2002/0025381 A1 | 2/2002 | Sonnenschein et al. .. | 427/372.2 |
| 2002/0028894 A1 | 3/2002 | Sonnenschein et al. ..... | 526/198 |
| 2002/0031607 A1 | 3/2002 | Sonnenschein et al. .. | 427/372.2 |
| 2002/0033227 A1 | 3/2002 | Sonnenschein et al. .. | 156/306.9 |
| 2002/0195453 A1 | 12/2002 | McLeod ...................... | 220/562 |
| 2003/0044553 A1 | 3/2003 | Ramanathan et al. ...... | 428/35.8 |
| 2003/0047268 A1 | 3/2003 | Korchnak et al. ............ | 156/94 |
| 2003/0199652 A1 * | 10/2003 | Deviny et al. ............... | 526/213 |
| 2003/0226472 A1 * | 12/2003 | Kneafsey et al. ........ | 106/18.13 |
| 2004/0077783 A1 * | 4/2004 | Maandi et al. .............. | 524/853 |
| 2004/0082743 A1 * | 4/2004 | Sonnenschein et al. ..... | 526/217 |
| 2004/0096610 A1 * | 5/2004 | Ramanathan et al. ...... | 428/35.7 |

FOREIGN PATENT DOCUMENTS

| | | | | |
|---|---|---|---|---|
| WO | WO 98/17694 | 4/1998 | ............. | C08F/4/52 |
| WO | WO 99/36484 | 7/1999 | .......... | C09J/163/00 |
| WO | WO 99/64528 | 12/1999 | ............. | C09J/4/00 |
| WO | WO 00/56779 | 9/2000 | ............. | C08F/4/52 |
| WO | WO 01/32716 A1 | 5/2001 | ............. | C09J/4/00 |
| WO | WO 01/32717 A2 | 5/2001 | ............. | C08F/4/00 |
| WO | WO 01/44311 A1 | 6/2001 | ............. | C08F/4/52 |
| WO | WO 03/0400151 A1 | 5/2003 | ............. | C07F/5/02 |

OTHER PUBLICATIONS

Brown, Herbert C., Boranes in Organic Chemistry, "Free–Radical Reactins of Organoboranes", pp. 433–439, Ithaca and London (1972).
Pelter, A. and Smith, K., "Organic Boron Compounds", 689–708, 728–732, and 773–784, London (1972).
Roscher, Christof, et al., Novel Radiation Curable Nanocomposites with Outstanding Material Properties, 322–329 (2002).
D. Barton and W.D. Ollis, "Comprehensive Organic Chemistry", vol. 3, Ed. by D.N. Jones, Pergamon Press, 1979, Part 14.

\* cited by examiner

*Primary Examiner*—Tatyana Zalukaeva
(74) *Attorney, Agent, or Firm*—Steven C. Bauman

(57) ABSTRACT

Use of an initiator system comprising:
  a combination of an organoborane and a polyaziridine, in a ratio of
  aziridine groups to boron atoms of greater than 1.3:1,
as an initiator of polymerisation in an adhesive composition for bonding a low surface energy substrate;
provided that the initiator system does not contain more than a trace amount of a complex of organoborane with a complexing agent selected from:
  an amine other than a polyaziridine;
  a complexing agent comprising at least one hydroxide;
  a complexing agent comprising at least one alkoxide; or
  amidine complexing agent.

An initiator system as described is of the formula VI:

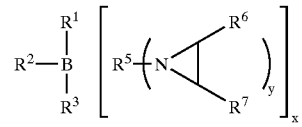

wherein $R^1$ is $C_1$–$C_{10}$ alkyl,
  $R^2$ and $R^3$, which may be the same or different, are, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring;
  $R^5$ is a polyvalent radical,
  $R^6$ and $R^7$ which may be the same or different are H or $C_1$–$C_{10}$ alkyl, particularly $C_{1-4}$ alkyl, especially methyl, and
  y is a number of at least 2, particularly 2–4, especially 3, and the value of x multiplied by y is greater than 1.3.

Particular examples of initiator compounds include, trimethylol propane tris(3-(2-methyl aziridino))propionate and trimethylol propane tris-3-N-aziridinyl propionate.

4 Claims, No Drawings

INITIATOR SYSTEMS, POLYMERISABLE COMPOSITIONS, AND USES THEREOF FOR BONDING LOW SURFACE ENERGY SUBSTRATES

FIELD OF THE INVENTION

This invention relates to polymerisation initiator systems, polymerisable compositions, particularly acrylic adhesive compositions, and uses thereof for bonding low surface energy substrates such as polyolefins to each other or to other substrates such as metals.

BRIEF DESCRIPTION OF RELATED TECHNOLOGY

It is well known that the bonding of polyolefin substrates and other low surface energy substrates causes particular difficulties. Attempts have been made to overcome this problem by extensive and expensive substrate surface preparation, for example by oxidation, plasma treatment, corona treatment or flame treatment, or by priming the surface with a high surface energy primer. However it is desired to develop adhesive compositions which will bond low surface energy substrates without such surface preparation.

The chemistry of organic boron compounds has been studied in detail (see "Comprehensive Organic Chemistry" by Barton D. and Ollis W. D., Volume 3, Edited by Jones D. N., Pergamon Press, 1979, Part 14). The use of organoboranes such as the trialkylboranes including triethylborane and tributylborane for initiating and catalyzing the polymerisation of vinyl monomers is well known. However such organoborane compounds are known to be flammable in air so that the compounds and compositions containing them require special handling and the compositions have poor shelf stability (see for example U.S. Pat. No. 3,236,823 Jennes et al., and the Background section of U.S. Pat. No. 5,935,711 Pocius et al., at column 2).

Certain boron alkyl compounds and their use as initiators of polymerisation are described in a series of patents of Wolfgang Ritter assigned to Henkel KgaA, including U.S. Pat. Nos. 4,515,724, 4,638,092, 4,638,498, 4,676,858 and 4,921,921 (hereinafter referred to as "the Ritter patents"). However the adhesive systems developed from these patents require the manufacture of trialkyl boranes from long chain fatty acids.

A series of patents of Skoultchi or Skoultchi et al. disclose a two-part initiator system for acrylic adhesive compositions in which the first part includes a stable organoborane amine complex and the second part includes a destabilizer or activator such as an organic acid or an aldehyde (U.S. Pat. Nos. 5,106,928; 5,143,884; 5,286,821; 5,310,835 and 5,367,746).

Japanese patent publication No. S48-18928 describes a method for adhering polyolefin or vinyl polymers using an adhesive obtained by adding trialkylboron to a vinyl monomer or vinyl monomer and vinyl polymer. Examples of trialkylboron include triisopropylboron, tri-n-butylboron, tripropylboron and tri-tert.-butylboron.

U.S. Pat. No. 3,275,611, Mottus et al. describes a process for polymerising unsaturated monomers with a catalyst comprising an organoboron compound, a peroxygen compound with an amine complexing agent for the boron compound. Use of the polymerisation products as adhesives is not discussed.

U.S. Pat. No. 5,539,070 of Zharov et al. assigned to Minnesota Mining and Manufacturing Company and a series of patents of Alphonsus V. Pocius or Pocius et al. also assigned to Minnesota Mining and Manufacturing Company, including in particular U.S. Pat. Nos. 5,616,796, 5,621,143, 5,681,910, 5,684,102, 5,686,544, 5,718,977, 5,795,657 and 5,935,711 describe organoborane amine complexes which can be used in systems that initiate the polymerisation of acrylic monomers in compositions useful for bonding low surface energy plastics substrates such as polyethylene, polypropylene and polytetrafluoroethylene. PCT Publication No. WO 99/64528 also of Minnesota Mining and Manufacturing Company describes low odour polymerisable compositions comprising monomer blends and organoborane amine complex initiators. The amine may be any primary or secondary amine, polyamine containing a primary or secondary amine, or ammonia. However these systems require the preparation of trialkyl borane amine complexes to achieve the desired performance and shelf stability. The manufacture of such complexes is an undesirably complicated process. Furthermore the presence of the amines results in cured adhesives that have a tendency to become yellow in colour on ageing.

PCT Publication No. WO 01/32716 of 3M Innovative Properties Company describes initiator systems comprising:

(1) a complexed initiator (for example an organoborane hydroxide complex, an organoborane alkoxide complex, or mixtures or combinations thereof); and (2) a decomplexer.

As described the complexing agents are of the formula $(^{(-)}O-R^4)_n M^{(m+)}$ wherein each $R^4$ is selected from hydrogen or an organic group and each of n and m are integers greater than zero.

PCT Publication No. WO 01/32717 also of 3M Innovative Properties Company describes initiator systems comprising:

(1) a complexed initiator that comprises a complex of an amidine complexing agent and an initiator; and (2) a decomplexer.

PCT Publication No. WO 01/44311 of Dow Chemical Company describes the use of other amine organoborane complex polymerisation initiators in compositions for bonding low surface energy substrates. The amine is selected from the group of amines having an amidine structural component; aliphatic heterocycles having at least one nitrogen in the heterocyclic ring wherein the heterocyclic compound may also contain one or more nitrogen atoms, oxygen atoms, sulphur atoms, or double bonds in the heterocycle; primary amines which in addition have one or more hydrogen bond accepting groups wherein there are at least two carbon atoms between the primary amine and the hydrogen bond accepting group, such that due to inter- or intramolecular interactions within the complex the strength of the B—N bond is increased; and conjugated imines. Included within this broadly defined group of amines are aliphatic heterocycles having at least one nitrogen atom in the heterocycle, one example of which is aziridine. Table 1 contains the results of testing of 68 borane/amine combinations, the last of which is tri-n-butyl borane (TBB) with trimethylolpropane tris (2-methyl-1-aziridine) propionate. However the results columns show that this combination at a molar ratio B:Amine of 1:1.3 was pyrophoric and that the adhesion in lap shear tests on polypropylene was zero. It may be inferred therefore that the polyaziridine as used in this test did not form a satisfactory complex, as it does not meet either of the two principal criteria for "complexes of the invention" set out at page 5 line 5 and lines 11–13 of the reference. In Table 2, binding energy calculations are listed for a substantial number of complexes of TBB with amines including aziridine and methylaziridine but no test results for performance of such complexes are stated.

It is known to use aziridine-functional materials, particularly polyaziridines, in polymerisation initiator systems based on an organoborane amine complex, the aziridine-functional material being a carrier or diluent for the organoborane amine complex, as described for example in PCT Publication No. WO 98/17694 (U.S. Pat. No. 5,935,711) or PCT Publication No. WO 99/64528. The above-mentioned PCT Publication Nos. WO 01/32716 and WO 01/32717 also describe the use of aziridine-functional materials as diluents for the alternative initiator complexes concerned therein. Although the aziridine-functional materials are described as "reactive diluents", it is stated that, generally, the diluent should not be reactive towards the complex and functions as an extender for the complex. It has hitherto been considered to be important that the organoborane should be used in the form of a complex with a complexing agent in order to achieve the desired level of stability and in particular to reduce the well-known pyrophoricity of organoborane compounds. As already noted, the manufacture of such complexes is an undesirably complicated process and the presence of amines results in cured adhesives that have a tendency to become yellow in colour on ageing.

So far as the present inventors are aware, it has never been suggested that a polyaziridine could be used successfully as a complexing agent with an organoborane. It has now surprisingly been found that an initiator system comprising a combination of an organoborane with a polyaziridine at a higher molar ratio than that described in example 68 of PCT Publication No. WO 01/44311 shows no significant pyrophoric activity and forms adhesive compositions with good bonding performance on low surface energy substrates.

There is a need for commercially acceptable compositions for bonding low surface energy substrates such as polyolefins and for end users to have a variety of such compositions which achieve that result through different technical strategies. Despite the work of many researchers in this field, there is a need for polymerisation initiators which reduce the problems described above and which provide alternative systems to those available hitherto. It is desirable to provide initiators which are commercially available compounds and/or which are relatively easy to handle compared to known initiator compounds.

SUMMARY OF THE INVENTION

In one aspect, the present invention relates to the use of an initiator system comprising:
a combination of an organoborane and a polyaziridine, in a ratio of
aziridine groups to boron atoms of greater than 1.3:1,
as an initiator of polymerisation in an adhesive composition for bonding a low surface energy substrate;
provided that the initiator system does not contain more than a trace amount of a complex of organoborane with a complexing agent selected from:
an amine other than a polyaziridine;
a complexing agent comprising at least one hydroxide;
a complexing agent comprising at least one alkoxide; or
an amidine complexing agent.

Desirably the ratio of aziridine groups to boron atoms is greater than 2:1, especially at least 3:1, particularly at least 4:1, more particularly at least 5:1, for example at least 8:1, and suitably not more than 40:1, more particularly from 8:1 to 11:1.

In another aspect, the present invention relates to the use of an initiator system comprising:
a combination of an organoborane and a polyaziridine, in a molar ratio of
aziridine to organoborane greater than 1.3:1,
as an initiator of polymerisation in an adhesive composition for bonding a low surface energy substrate;
provided that the initiator system does not contain more than a trace amount of a complex of organoborane with a complexing agent selected from:
an amine other than a polyaziridine;
a complexing agent comprising at least one hydroxide;
a complexing agent comprising at least one alkoxide; or
an amidine complexing agent.

Suitably the molar ratio of aziridine to organoborane is at least 2:1, particularly 3:1. Suitably the molar ratio of polyaziridine to organoborane is not more than 15:1.

It is the intention of the above provisos to exclude all complexes of organoboranes with complexing agents which are known in the prior art as initiator systems in adhesive systems for bonding low surface energy substrates. Preferably no significant amount of such a complex is present. However a trace of such a complex may be present, for example as an impurity arising from preparation procedures, without departing from the scope of the claim. Desirably there is no significant amount, or effective amount, or more than a trace, of another agent (apart from the polyaziridine) which complexes with the organoborane.

Organoboranes for use as polymerisation initiators are well known. Particularly suitable compounds are alkylboranes, i.e. having at least one alkyl group. Trialkylboranes are preferred. The organoborane may suitably be of the formula I:

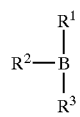

wherein $R^1$ is $C_1$–$C_{10}$ alkyl, and $R^2$ and $R^3$, which may be the same or different, are $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring.

An alkyl group may suitably have 1–6 carbon atoms, for example 1–4 carbon atoms. An alkyl group may be straight-chain or branched. A carbocyclic ring may be bridged by the boron atom in formula I.

Polyaziridines have more than one aziridine group

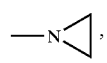

the carbon atom(s) of which may optionally be substituted by $C_1$–$C_{10}$ alkyl groups, particularly $C_1$–$C_3$ alkyl groups. Tri-functional polyaziridines are preferred. Polyaziridines are described in PCT Publication No. WO 98/17694 (U.S. Pat. No. 5,935,711) or PCT Publication No. WO 99/64528, U.S. Pat. No. 3,225,013 and U.S. Pat. No. 5,401,505, the contents of all which are incorporated herein by reference. Suitable polyaziridines may be represented by the formula II:

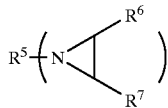

wherein $R^5$ is a polyvalent radical, $R^6$ and $R^7$ which may be the same or different are H or $C_1$–$C_{10}$ alkyl, particularly $C_{1-4}$ alkyl, especially methyl, and y is a number of at least 2, particularly 2–4, especially 3. The polyvalent radical $R^5$ may be any suitable polyvalent alkyl, aryl or alkaryl radical or it may be a phosphine oxide group. In the definition of $R^5$, alkyl may suitably have 1–60 carbon atoms, particularly 4–40 carbon atoms; aryl may suitably have 6–65 carbon atoms, particularly 6–45 carbon atoms; alkaryl may suitably have 7–66 carbon atoms, particularly 7–46 carbon atoms. Alkyl or the alkyl moiety of alkaryl may be straight chain or branched. Alkyl, aryl or alkaryl may be substituted or interrupted by one or more hetero atoms or hetero atom-containing groups that do not substantially affect the performance of the polyaziridine, such as alcohols, esters or ethers. A hetero atom may be selected from O, S or N, particularly O. $R^5$ may suitably contain a carbonyl group. According to one feature of the invention, $R^5$ is an acetate or propionate of a polyvalent alcohol.

The polyaziridine may suitably be of the formula III:

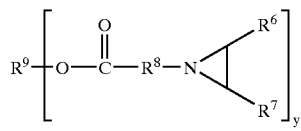

wherein $R^9$ is y-valent alkyl, aryl or alkaryl as defined above for $R^5$, $R^8$ is $C_1$–$C_{10}$ alkylene, and $R^6$, $R^7$ and y are as defined above.

In the definition of $R^9$, alkyl may suitably have 1–40 carbon atoms, particularly 4–24 carbon atoms; aryl may suitably have 6–45 carbon atoms, particularly 6–30 carbon atoms; alkaryl may suitably have 7–46 carbon atoms, particularly 7–31 carbon atoms. Alkyl or the alkyl moiety of alkaryl may be straight chain or branched. Alkyl, aryl or alkaryl may be substituted or interrupted by one or more hetero atoms or hetero atom-containing groups that do not substantially affect the performance of the polyaziridine, such as alcohols, esters or ethers. A hetero atom may be selected from O, S or N, particularly O.

Desirably, $R^9$ is a residue of a polyfunctional alcohol, particularly a tri- or tetra-functional alcohol. $R^9$ may suitably be of the formula IV:

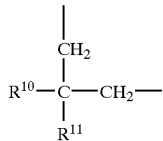

when y=2, or of the formula V:

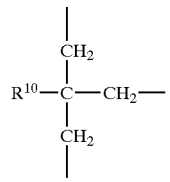

when y=3, wherein $R^{10}$ and $R^{11}$, which may be the same or different, are hydroxy $C_1$–$C_5$ alkyl particularly hydroxymethyl, or a $C_1$–$C_{10}$ alkyl group, particularly a $C_1$–$C_5$ alkyl group, more particularly propyl.

Particularly suitable polyaziridines are commercially available compounds such as trimethylol propane tris(3-(2-methyl aziridine)propionate), trimethylol propane tris-3-N-aziridinyl propionate, pentaerythritol tris(3-(2-methyl aziridine)propionate) and tris(2-methyl-1-aziridinyl) phosphine oxide.

In one aspect therefore the invention relates to the use of an initiator system of the formula VI:

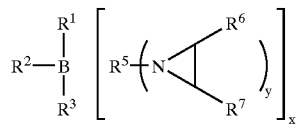

wherein $R^1$–$R^3$, $R^5$–$R^7$ and y are as defined above, and the value of x multiplied by y is greater than 1.3, as an initiator of polymerisation in an adhesive composition for bonding a low surface energy substrate.

The organoboranes and polyaziridines used in the present invention are commercially available or readily prepared by available methods. The initiator systems of the invention do not require the use of the amines which have been used in the past to for complexes with organoboranes. Once the organoborane of such known complexes has reacted in a polymerisable composition, the amine can cause yellowing of a cured composition after ageing. A reduction or elimination of yellowing is a particular advantage for adhesives which are to be used in locations where appearance is important, e.g. in automobile manufacture. Amines may also give rise to odour problems.

The invention provides a polymerisable adhesive composition for bonding a low surface energy substrate to a similar or different substrate, which includes:

a) at least one free-radically polymerisable monomer component, and b) an effective amount of an initiator system for initiating polymerisation of the free-radically polymerisable monomer, said initiator system comprising a combination of an organoborane and a polyaziridine as defined above.

The polymerisable composition may suitably be a two-part composition in which at least one free-radically polymerisable monomer component is provided in one part and the initiator system is provided in the other part. Alternatively the composition could be a one-part composition with suitable stabilisation and activation systems such as a moisture-latent acid or oxygen-latent acid. In a further alternative, the initiator system could be provided as a primer which is applied to a substrate separate from the polymerisable monomer component. In another alternative, the initiator system could be provided in the polymerisable monomer component and an activation system such as an acid could be provided as a primer or as a separate component.

The polymerisable monomer or monomers may suitably include one or more (meth)acrylic monomers.

In one aspect the invention provides a two-part polymerisable adhesive composition for bonding a low surface energy substrate to a similar or different substrate, which includes:

part A) an effective amount of a polymerisation initiator system comprising a combination of an organoborane and a polyaziridine as defined above, and part B) at least one (meth)acrylate monomer, optionally with a toughener, acidic monomer, filler or thickener.

Part B may suitably be a (meth)acrylic component. The terms (meth)actylic and (meth)acrylate are used synonymously herein with regard to the monomer and monomer-containing component. The terms (meth)acrylic and (meth)acrylate include acrylic, methacrylic, acrylate and methacrylate.

No amines (other than polyaziridines, if they are regarded as amines) are required as complexing agents in the initiator systems of the invention. In preferred compositions no amine (other than the polyaziridine(s)) is present in the initiator system.

The adhesive compositions disclosed herein are useful for bonding low surface energy substrates e.g. those having a surface energy of less than 45 mJ/m$^2$, more particularly polyolefins including polyethylene and polypropylene, acrylonitrile-butadiene-styrene and polytetrafluoroethylene, or relatively low surface energy substrates such as polycarbonate, to similar substrates, to each other, or to different substrates including metals, other plastics and glass.

Furthermore the invention provides a method for bonding a low surface energy substrate to a similar or different substrate, wherein the method comprises applying an adhesive composition as defined above to at least one of the substrates, bringing the substrates together and allowing the composition to cure. In one aspect, the invention provides a method as defined above for bonding polyolefin substrates.

In particular the invention provides a method for bonding a low surface energy substrate to a similar or different substrate, wherein the method comprises mixing parts A and B of a two part adhesive composition as defined above immediately prior to use in order to initiate polymerisation, applying the mixed adhesive composition to at least one of the substrates, bringing the substrates together and allowing the composition to cure by completion of the polymerisation initiated on mixing of the two parts A and B.

DETAILED DESCRIPTION OF THE INVENTION

In one type of organoborane, $R^1$–$R^3$ may suitably be the same or different alkyl groups and each may suitably be a $C_1$–$C_{10}$ alkyl group, particularly a $C_1$–$C_6$ alkyl group, more particularly a $C_2$–$C_6$ alkyl group. Large or bulky alkyl groups are considered to be less likely to provide desirably active initiators, as will be understood by those skilled in free-radical chemistry.

In another type of organoborane, one or both of $R^2$ and $R^3$ may be phenyl. Desirably not more than one of $R^2$ and $R^3$ contains a phenyl group and at least two of $R^1$–$R^3$ are $C_1$–$C_3$ alkyl. It will be understood by those skilled in the art that a phenyl group (if present) may be substituted in the ring by one or more substituents which do not affect the activity of the compound of formula I as a polymerisation initiator.

Such ring-substituents include $C_1$–$C_{10}$ alkyl, for example $C_1$–$C_6$ alkyl, particularly methyl.

The quantity of the initiator system as defined above may suitably be such as to provide 0.01% to 5% by weight, particularly 0.01% to 2% by weight, such as 0.01 to 0.6% by weight, of boron in the total composition.

According to one feature of the present invention, the free radically polymerisable monomer is monofunctional i.e. has one olefinically unsaturated bond per molecule. Suitable monomers include monofunctional (meth)acrylate monomers including acrylate and methacrylate esters and substituted derivatives thereof such as hydroxy, amide, cyano, chloro, and silane derivatives. Such monomers include tetrahydrofurfuryl (meth)acrylate, methyl (meth)acrylate, ethyl (meth)acrylate, isobomyl methacrylate, hydroxyethyl methacrylate, hydroxypropyl (meth)acrylate, butyl acrylate, n-octyl acrylate, 2-ethylhexyl (meth)acrylate, decylmethacrylate, dodecyl methacrylate, cyclohexyl methacrylate, tert.-butyl methacrylate, acrylamide, gamma-methacryloxypropyl trimethoxysilane, 2-cyanoethyl acrylate, 3-cyanopropyl acrylate, tetrahydrofurfuryl chloroacrylate, and glycidyl (meth)acrylate.

Blends of two or more monomers, particularly two or more (meth)acrylate monomers, may desirably be used, the choice of monomers in the blend being determined by the end use application of the compositions, as known to those skilled in the art.

In addition, the free radically polymerisable monomer(s) may include a minor proportion, e.g. up to 20%, particularly upo tp 15%, by weight based on the total composition, of difunctional or poltfunctional monomer(s) selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Among suitable acrylates and methacrylates are those used in polymerisable systems such as disclosed in U.S. Pat. Nos. 4,295,909, 4,018,851, 4,963,220 to Baccei et. al., and U.S. Pat. No. 4,215,209 to Ray-Chaudhuri et. al. or polyfunctional methacrylates, silicone diacrylates and polyfunctional acrylated urethanes of the type known to be useful in formulating adhesives e.g. as disclosed in U.S. Pat. No. 4,092,376 to Douek et. al.) or a thiol-ene (e.g. as disclosed in U.S. Patent Nos. 3,661,744, 3,898,349, 4,008,341 or 4,808,638). The contents of the above-mentioned patents are incorporated herein by reference.

The addition of an acid (which term includes a latent acid) in the monomer component, in a separate part of the composition from that which contains the initiator system as defined above, is desirable. For certain substrates and/or certain polymerisation speeds, the presence of an acid may be required. In other cases, acidic residues, for example in the monomers, may be sufficient. Alternatively, or in addition, the initiator system as defined above may react with another compound in the composition (particularly in Part B of a two-part composition), thus freeing the organoborane to initiate polymerisation of the polymerisable composition. In the case of a 2-part composition, the reaction takes place after mixing of the two parts, one containing the initiator system as defined above and the other containing the compound reactive therewith.

The acid when added may suitably be a weak acid. Lewis acids may be used (see U.S. Pat. No. 5,539,070 to Zharov et al., the contents of which are incorporated herein by reference). The pKa of the weak acid normally is no lower than about 0.5 with the desirable limit being about 0.9. The upper limit normally is about 13, or less, such as 11.5. However, carboxylic acids which have a pKa of up to about 8, such as 6 or 7, are particularly suitable.

The carboxylic acids may contain one or more carboxyl groups, suitably 1 to 4, and more preferably 1 to 2, carboxyl groups. Suitable aliphatic carboxylic acids ordinarily include $C_{1-18}$ chains, such as $C_{1-10}$ monocarboxylic acids.

Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. It is particularly suitable to use an acidic monomer which can itself be polymerised, so that it is bound into the cured polymer composition, for example a part-ester of a polyfunctional acid wherein the ester group contains a free-radically polymerisable component, particularly a (meth)acrylic halfester of a difunctional acid such as maleic, fumaric or succinnic acid e.g. 2-(meth)acryloyloxyethyl maleate, 2-(meth)acryloxyethyl fumarate or 2-(meth)acryloxyethyl succinate. The effective amount of the acid (or the acid residue of an acidic monomer or residue resulting from preparation of a monomer) is suitably within the range from about 0.1 to about 20%, particularly from about 0.1 to about 10%, such as from about 0.5 to about 5%, by weight based on the weight of the polymerisable composition. The amount of an acidic monomer is suitably within the range from about 0.1% to about 25%, such as about 0.5% to about 15%, by weight based on the weight of the polymerisable composition.

In a two-part composition, part B suitably contains at least two monomers, one of which is an acidic monomer.

The acid may be present as a latent acid, particularly a masked carboxylic acid compound hydrolyzable on contact with moisture, such as an acid anhydride, as described in EP-A-0 356 875 and U.S. Pat. No. 5,268,436, the contents of which are incorporated herein by reference, or a compound from which an acid is released in contact with oxygen. A latent acid may be used in Part B of a two-part composition, in which the acid is released on mixing the two parts, or in a one-part composition.

The presence of air or oxygen is desirable at the time of initiation of polymerisation e.g. when the two parts of a two-part composition are mixed.

Suitable polyaziridines are described as diluents in PCT Publication No. WO 99/64528, which in turn refers to PCT Publication No. WO 98/17694, equivalent to U.S. Pat. No. 5,935,711. Polyfunctional aziridines such as trimethylolpropane tris(3-(2-methylaziridino) propionate are particularly suitable. The polyaziridine may also act as a cross-linking agent in the polymerisable composition, e.g. by reaction with an acid monomer or polymeric acid which may suitably be present in the composition as described above.

The polyaziridine should be generally soluble in monomers included in the polymerisable composition, such that the parts of the two-part composition can be readily mixed. By "soluble" is meant that no evidence of gross phase separation at room temperature (i.e., about 20° C. to about 25° C.) is visible to the unaided eye. Similarly, the organoborane should also desirably be soluble in thepolyaziridine, although slightly warming a mixture of the organoborane and the polyaziridine may be helpful in forming a solution of the two at room temperature (i.e., about 22° C. to about 25° C.). Preferably, the polyaziridine is a liquid at or near room temperature (i.e., within about 10° C. of room temperature) or forms a liquid solution with the organoborane at or near room temperature.

Suitable carriers for the initiator system may be present including liquid polyethers, liquid polyethers capped with non-reactive groups being groups which are not susceptible to free-radical polymerisation such as epoxies, liquid polyesters, polyisoprene or polybutadiene. A thickened solvent could also be used as a carrier. Polytetrahydrofuran could be used as both solvent and carrier. The quantity of carrier may suitably be in the range from about 5% to about 50% by weight, for example 5% to 25% by weight, particularly 5% to 10% by weight, of the total composition.

The initiator system as described above, optionally with a thickener or filler, is usually contained in Part A—the initiator component—of a two-part composition.

The monomer-containing component may suitably include a toughener to improve the impact resistance and peel resistance of the bond while maintaining adhesive strength. Suitable tougheners include elastomeric materials such as polybutadiene rubbers, polyisoprene (.e.g. available under the trade name Kratan), acrylonitrile-butadiene-styrene (e.g. available under the trade name Hycaror or as core-shell polymers under the trade name Blendex), or polystyrenes. For bonding polyolefins it is desirable to use a core-shell polymer. The use of core-shell polymers in (meth)acrylate-based compositions is described, for example, in U.S. Pat. Nos. 4,536,546 and 4,942,201 Briggs et al. assigned to Illinois Tool Works. Core shell polymers are suitably graft copolymer resins (e.g. acrylonitrile-butadiene-styrene graft copolymers or others described in the above-mentioned patents of Briggs et al.) in the form of particles that comprise rubber or rubber—like cores or networks that are surrounded by relatively hard shells. In addition to improving the impact resistance of the bond, core-shell polymers can also impart enhanced spreading and flow properties to the composition (see WO 99/64528). These enhanced properties include a reduced tendency for the composition to leave an undesirable "string" upon dispensing from a syringe-type applicator, or sap or slump after having been applied to a vertical surface. The quantity of toughener may suitably be in the range from about 1% to about 40% by weight, particularly about 5% to about 25% by weight, of the total composition.

The composition may optionally further comprise oxidising agents, reducing agents, thickeners, fillers, non-reactive colourants and pigments, metal salts (particularly transition metal salts) and free radical polymerisation stabilisers. The optional additives are used in an amount that does not significantly adversely affect the polymerisation process or the desired properties of polymerisation products made thereby.

Suitable reducing agents may be, but are not limited to, acetylphenylhydrazine, tetramethylthiourea or thiocaprolactam. Suitable oxidising agents may be, but are not limited to, peroxides and hydroperoxides.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company, under the trademark Elvacite, as well as styrene-methyl methacrylate co-polymers and poly-bisphenol A maleate or propoxylated bisphenol-A-fumarate polyester (sold under the trademark Atlac). It is also possible to add inert filling materials such as finely divided silica, fumed silica (treated or untreated), montmorillonite, clay, bentonite and the like. The use of micronized silica would result in a paste-like thixotropic composition.

It is an advantage of the present invention that a broader range of thickeners can be used than with an initiator system containing amine. Additionally, it is conventional to include in adhesive formulations certain "inert" fillers such as wood flour, glass fibres and hollow glass spheres, cotton linters, mica, alumina, silica and the like to modify viscosity, improve impact resistance and for other purposes such as spacing to provide a minimum bond thickness in the case of hollow glass spheres, e.g. at least 100 micrometers. Such fillers could be incorporated in the formulations of the present invention. The quantity of filler is suitably from about 0.5% to about 20%, for example about 1.0% to about 5.0%, by weight of the composition. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

It is a particular advantage of the invention that polyolefin materials can be used as fillers in the composition. Polyolefin powders such as polyethylene powder or polypropylene powder are relatively inexpensive and in a composition which readily bonds to a polyolefin the filler becomes securely adhered into the cured composition. Polyethylene or polypropylene powders can be used with particle sizes in the range from 0.01 mm to 1 mm, particularly 0.02 mm to 0.3 mm, allowing a good control of the gap between substrates (i.e. the depth of adhesive). Particularly suitable polyethylene powders are commercially available under the trade name Microthene. Polyethylene flock and polyolefin chopped fibre can also be used as fillers. The amount of polyolefin filler may suitably be 0.5% to about 20%, particularly 1.0% to about 10%, by weight of the composition.

Compositions of the present invention may be used as adhesives, sealants, surface coatings, moulding resins and composite matrices, for example with "fleece" or "padding" materials of glass fibre, carbon fibre, metal fibre, polyethylene or polypropylene fibre or foams, or any combination of them, in which bonding to a low surface energy polymer is required.

The compositions may be used in an un-polymerised state, in which case polymerisation occurs in situ, or they may be used in a part-polymerised state, in which case polymerisation is completed in situ.

The components of a two-part composition may suitably be mixed immediately prior to use in a manner known to those skilled in the art.

The compositions of the invention are suited for use with conventional, commercially available dispensing equipment for two-part adhesives, for example a dual syringe applicator and a static mixer nozzle. In general the compositions are suitable for curing at room temperature, i.e. 20–25° C. without added heat or other energy input although heat input may be desirable in some instances, for example to accelerate cure.

The compositions of the present invention may suitably comprise about . . . % to about . . . % by weight of the initiator system as defined above, about 5% to about 50% by weight of additional non-polymerisable carrier (if present), about 0.1% to about 20% by weight of the acid (if present), about 5% to about 85% by weight of the polymerisable monomer(s) and about 1% to about 40% by weight of the toughner (if present).

The compositions of the invention may suitably consist essentially of the ingredients defined in the preceding sentence, together with conventional ingredients such as fillers, thickeners or stabilizers, making up the total composition as 100%.

In a two-part composition, the parts may suitably be provided in a weight ratio in the range from 1:10 to 1:1 of initiator-containing part A to monomer-containing part B, for example from 1:10 to 1:2, or from 1:10 to 1:4.

EXAMPLE

The following example will illustrate the invention. In the example the trimethylolpropane tris(3-(2-methyl-aziridine) propionate) used is commercially available from Sigma-Aldrich Ireland Limited of Tallaght, Dublin 24, Ireland. The core-shell toughener used is commercially available from GE Speciality Chemicals via Blagden Chemical Specialities Limited, London WC1X 8NJ, England under the tradename Blendex 336.

In the example the mixed adhesive composition is prepared using a MIXPAC System 50 dual syringe applicator having volume ratio as described, and a 17 stage static mixer nozzle, both commercially available from METIX (UK) Limited of Kettering NN16 8PX, England.

The tests on polypropylene substrates were carried out on filled polypropylene (i.e. polypropylene PP-HWST supplied by Simona U.K. (Limited) of Stafford, England) unless otherwise indicated.

In carrying out the tests, no tendency to catch fire was observed during the handling of the initiator system.

Initiator Component (Part A)

Part A was formulated by mixing, under nitrogen, trimethylolpropane tris(3-(2-methyl-aziridine)propionate) (3 g) and triethyl borane 1 molar solution in tetrahydrofuran (2 g) i.e. a molar ratio of polyaziridine to organoborane of 3.2:1, corresponding to a ratio of aziridine groups to boron atoms of 9.6:1. Surprisingly the Part A component showed no pyrophoric activity when tested by applying samples to filter paper and exposing to air.

Adhesive Component (Part B)

A core-shell toughner (10 g), available commercially under the tradename Blendex 336 from GE Speciality Chemicals, was added to tetrahydrofurfuryl methacrylate (25 g), 2-ethylhexyl methacrylate (83 g), and hydroxy ethyl methacrylate monoester of succinic acid (6.7 g) with heating to a temperature up to about 50° C. and stirring to form a homogeneous solution.

Mixed Adhesive Composition

The initiator component A (5 g) and adhesive component B (45 g) were packaged respectively into the two syringes of a MIXPAC System 50 1:10 volume ratio 50 ml dual syringe applicator having a 1:10 volume ratio between the syringes holding the components A and B respectively. The two components were mixed by the simultaneous extrusion through a 17 stage static mixer nozzle. The mixed adhesive composition was tested on a range of substrates as follows:

Samples of the adhesive were spread onto an untreated test-piece (4×1 inches)–101.6×25.4 mm) to form a film of approximately 0.1 mm in depth. Following which a second test-piece was brought against the adhesive to form an overlap adhesive joint with 0.25 inch (6.3 mm) overlap. A clamp was applied to the overlap area and the adhesive joint allowed to cure overnight, approximately 24 hours, at room temperature. The bond strengths for bonds assembled using the above procedure were tested on a Instron tester according to ASTM-D1002 and are presented in the table below.

| Substrates | Shear Strengths MPa |
|---|---|
| Polyethylene/Polyethylene | 4.2 |
| Polypropylene/Polypropylene | 2.2 |
| Mild Steel/Mild Steel | 5.7 |
| GBMS/GBMS | 9.0 |

The adhesive showed good performance on polyolefin substrates as well as meal substrates.

GBMS is grit-blasted mild steel.

What is claimed is:

1. A polymerisable adhesive composition for bonding a low surface energy substrate to a similar or different substrate, comprising:
   a) at least one free-radically polymerisable monomer component, and
   b) an effective amount of an initiator system for initiating polymerisation of the free-radically polymerisable monomer, said initiator system comprising:
   a combination of an organoborane and a polyaziridine, in a ratio of aziridine groups to boron atoms of greater than 1.3:1, provided that the initiator system does not contain more than a trace amount of a complex of organoborane with a complexing agent selected from:
   an amine other than a polyaziridine;
   a complexing agent comprising at least one hydroxide;
   a complexing agent comprising at least one alkoxide; or
   an amidine complexing agent and provided that the initiator system is substantially free of amine.

2. A composition according to claim 1 which is a two-part composition in which the free-radically polymerisable monomer component is provided in one part and the initiator system is provided in the other part.

3. A two-part polymerisable adhesive composition according to claim 1 comprising:
   part A) an effective amount of a polymerisation initiator system comprising:
   a combination of an organoborane and a polyaziridine, in a ratio of aziridine groups to boron atoms greater than 1.3:1,
   provided that the initiator system does not contain more than a trace amount of a complex of organoborane with a complexing agent selected from:
   an amine other than a polyaziridine;
   a complexing agent comprising at least one hydroxide;
   a complexing agent comprising at least one alkoxide; or
   an amidine complexing agent and provided that the initiator system is substantially free of amine; and
   part B) at least one (meth)acrylate monomer, together with a compound reactive with the initiator system to free the organoborane therefrom, and optionally with a toughener, filler or thickener.

4. A composition according to claim 3 wherein the compound in part B that is reactive with the initiator system is an acid or acidic monomer.

* * * * *